US012754787B1

(12) United States Patent
Jang et al.

(10) Patent No.: US 12,754,787 B1
(45) Date of Patent: Oct. 6, 2026

(54) METHOD FOR PROVIDING SERVICE BY AGENTIC AI USING KEY-VALUE STORAGE AND AGENTIC AI USING THE SAME

(71) Applicant: SUPERB AI CO., LTD., Seoul (KR)

(72) Inventors: Taewoong Jang, Seoul (KR); Kye Hyeon Kim, Seoul (KR)

(73) Assignee: SUPERB AI CO., LTD., Seoul (KR)

( * ) Notice: Subject to any disclaimer, the term of this patent is extended or adjusted under 35 U.S.C. 154(b) by 0 days.

(21) Appl. No.: 19/350,863

(22) Filed: Oct. 6, 2025

(30) Foreign Application Priority Data

Aug. 12, 2025 (KR) ........................ 10-2025-0111740

(51) Int. Cl.
*G06F 9/54* (2006.01)
*G06Q 10/0631* (2023.01)

(52) U.S. Cl.
CPC ....... *G06F 9/547* (2013.01); *G06Q 10/06316* (2013.01)

(58) Field of Classification Search
CPC .......................... G06F 9/547; G06Q 10/06316
USPC ........................................................ 719/330
See application file for complete search history.

(56) References Cited

U.S. PATENT DOCUMENTS

2014/0281373 A1* 9/2014 Nilsson .................. G06F 9/381 712/7
2014/0379638 A1* 12/2014 Li .......................... G06F 16/27 707/610
2021/0133438 A1* 5/2021 Florencio ................ G06F 18/41
2023/0333825 A1* 10/2023 Sanghi .................... G06F 8/441
2023/0343043 A1* 10/2023 Greunke ................. A63F 13/65
2024/0020538 A1* 1/2024 Socher .................. G06F 16/243
2024/0054035 A1* 2/2024 Bhargav ................. G06N 3/006
2024/0126881 A1* 4/2024 Lewak .................. G06F 21/566
2024/0152994 A1* 5/2024 Luk .................... G06Q 30/0633
2024/0161203 A1* 5/2024 Falandino ........ G06Q 10/06311
2024/0202452 A1* 6/2024 Schillace ............... G06N 3/045
2024/0256791 A1* 8/2024 Santhanam ............ G06N 3/045
2024/0311093 A1* 9/2024 Schaefer ................... G06F 8/37
2024/0406003 A1* 12/2024 Murialdo ............. H04L 9/3247
(Continued)

FOREIGN PATENT DOCUMENTS

KR 20250104738 A 7/2025
KR 20250114465 A 7/2025

OTHER PUBLICATIONS

KR Office Action mailed on Sep. 16, 2025 for application No. 10-2025-0111740.

(Continued)

*Primary Examiner* — Tuan C Dao
(74) *Attorney, Agent, or Firm* — Maschoff Brennan

(57) ABSTRACT

A method of providing a service by an agentic AI using a key-value storage is provided. The method includes analyzing the natural language instruction through an LLM to thereby determine a first task to an n-th task; for an i-th task, storing i-th data in the key-value storage through a set-value tool and acquiring an i-th key; calling an i-th tool by using the i-th key, to thereby instruct the i-th tool to (i) acquire the i-th data from the key-value storage through a get-value tool and (ii) transmit, an i-th task result acquired after performing the i-th task by using at least the i-th data; and for an index i among 1 to n that is yet to be performed generating a response by referring to a first task result to an n-th task result corresponding to the first task to the n-th task.

10 Claims, 4 Drawing Sheets

(56) References Cited

U.S. PATENT DOCUMENTS

| | | | | |
|---|---|---|---|---|
| 2025/0021405 | A1* | 1/2025 | Bastiansen | G06F 9/522 |
| 2025/0042024 | A1* | 2/2025 | Dijkman | B25J 9/161 |
| 2025/0095641 | A1 | 3/2025 | Piskala | |
| 2025/0156955 | A1* | 5/2025 | Ramaswamy | G06Q 40/08 |
| 2025/0252267 | A1 | 8/2025 | Li et al. | |
| 2025/0254105 | A1 | 8/2025 | Zhou et al. | |
| 2025/0284748 | A1* | 9/2025 | Chowdhury | G06F 16/9538 |
| 2025/0356026 | A1* | 11/2025 | Myers | G06F 11/3684 |

OTHER PUBLICATIONS

Yongliang Shen et al., "HuggingGPT: Solving AI Tasks with ChatGPT and its Friends in Hugging Face," Zhejiang University, Microsoft Research Asia, 37th Conference on Neural Information Processing Systems (NeurIPS 2023).

* cited by examiner

METHOD FOR PROVIDING SERVICE BY AGENTIC AI USING KEY-VALUE STORAGE AND AGENTIC AI USING THE SAME

CROSS REFERENCE OF RELATED APPLICATION

This present application claims the benefit of the earlier filing date of Korean non-provisional patent application No. 10-2025-0111740, filed on Aug. 12, 2025, the entire contents of which being incorporated herein by reference.

FIELD OF THE DISCLOSURE

The present disclosure is related to an agentic AI; and more particularly, to a method of providing a service by the agentic AI using a key-value storage and the agentic AI using the same.

BACKGROUND OF THE DISCLOSURE

A generative AI may respond to user prompts by generating outputs based on what the user instructed a trained model to do. Recently, an agentic AI which may perform more complex instructions is advancing. Unlike the generative AI that focuses on a generation only, the agentic AI also focuses on an autonomous decision making and its corresponding execution to achieve a goal. Therefore, it is a more advanced artificial intelligence technology than the generative AI.

The agentic AI goes beyond a simple generation but performs a series of autonomous decision-making processes, such as setting goals, analyzing problems, establishing and executing multi-step plans, evaluating results, and revising the multi-step plans as necessary. Therefore, it must interact with various external tools and systems for web searches, API calls, and database queries, etc. in order to handle complex tasks.

Additionally, with the advent of MCP (Model Context Protocol), the agentic AI can now use more tools, such as various available tools based on the MCP, thereby making complex instructions using a variety of tools possible.

However, when passing inputs or outputs using the tools to perform the complex tasks, errors may occur. The agentic AI may be trained and implemented to be able to properly correct simple grammatical errors in instructions for using the tools and retry the corrected instructions, however, if there is a contamination in the data itself, it may not be able to detect the contamination to correct and retry the instructions. Therefore, the contamination in the data itself may cause an incorrect result or an unintended result.

Further, the agentic AI's Large Language Model (LLM) is usually charged in proportion to a length of an input text, therefore, high costs may be incurred when large amounts of the data are transferred due to the complex tasks. Further, the data larger than a maximum text size (i.e., Context Size) that the LLM can handle cannot be transferred.

Therefore, an improvement for solving these problems is required.

SUMMARY OF THE DISCLOSURE

It is an object of the present disclosure to solve all the aforementioned problems.

It is another object of the present invention to allow data required for performing a natural language instruction to be transmitted to a tool by using a key-value storage.

It is still another object of the present invention to reduce a cost of transmission for performing the natural language instruction by transmitting a key corresponding to the data stored in the key-value storage to the tool instead of transmitting the data itself to the tool.

It is still yet another object of the present invention to effectively respond to errors caused by the data itself by transmitting the key corresponding to the data stored in the key-value storage to the tool instead of transmitting the data itself to the tool.

In order to accomplish objects above and characteristic effects to be described later of the present disclosure, distinctive structures of the present disclosure are described as follows.

In accordance with one aspect of the present disclosure, there is provided a method of providing a service by an agentic AI using a key-value storage, including steps of: (a) in response to receiving a natural language instruction, analyzing, by the agentic AI, the natural language instruction through an LLM (Large Language Model), to thereby determine a first task to an n-th task corresponding to the natural language instruction, wherein n is an integer greater than or equal to 1; (b) for an i-th task among the first task to the n-th task, storing, by the agentic AI, i-th data required to perform the i-th task in the key-value storage through a set-value tool and acquiring, by the agentic AI, an i-th key corresponding to the i-th data; (c) calling, by the agentic AI, an i-th tool corresponding to the i-th task by using the i-th key, to thereby instruct the i-th tool to (i) acquire the i-th data corresponding to the i-th key from the key-value storage through a get-value tool and (ii) transmit, to the agentic AI, an i-th task result acquired after performing the i-th task by using at least the i-th data; and (d) repeating, by the agentic AI, the step (b) and the step (c) for an index i among 1 to n that is yet to be performed and generating, by the agentic AI, a response corresponding to the natural language instruction by referring to a first task result to an n-th task result acquired from a first tool to an n-th tool corresponding to the first task to the n-th task.

As one example, at the step of (b), the agentic AI (i) generates i1-th data by converting a format of the i-th data through the set-value tool, (ii) stores the i1-th data in the key-value storage, and (iii) acquires an i1-th key corresponding to the i1-th data, and wherein, at the step of (c), the agentic AI calls the i-th tool by using the i1-th key corresponding to the i1-th data, to thereby instruct the i-th tool to (i) acquire the i1-th data corresponding to the i1-th key from the key-value storage through the get-value tool and (ii) transmit, to the agentic AI, the i-th task result acquired after performing the i-th task by using the i1-th data corresponding to the i-th data.

As one example, at the step of (c) while repeating the step of (d), the agentic AI uses the i-th key and a k-th key, which corresponds to k-th data that is different from the i-th data, to call the i-th tool, to thereby instruct the i-th tool to (i) acquire the i-th data and the k-th data respectively corresponding to the i-th key and the k-th key from the key-value storage through the get-value tool and (ii) transmit, to the agentic AI, the i-th task result acquired after performing the i-th task by using the i-th data with the k-th data being used as a query.

As one example, at the step of (c), in response to receiving a key-error message, which is generated due to a result of an inability to obtain the i-th data corresponding to the i-th key from the key-value storage through the get-value tool, the agentic AI performs an error correction of the i-th key that was used to call the i-th tool and re-calls the i-th tool by using the error-corrected i-th key.

As one example, the key-value storage includes a database, and the agentic AI generates the i-th key corresponding to the i-th data through the set-value tool and stores the i-th key and the i-th data by matching them in the database.

As one example, the key-value storage includes an object storage or a cloud storage, and the agentic AI stores the i-th data in the object storage or the cloud storage through the set-value tool and generates the i-th key by referring to path information for the i-th data stored in the object storage or the cloud storage.

In accordance with another aspect of the present disclosure, there is provided an agentic AI for providing a service by using a key-value storage, including: at least one memory that stores instructions; and at least one processor configured to execute the instructions to perform processes of: (a) in response to receiving a natural language instruction, analyzing the natural language instruction through an LLM (Large Language Model), to thereby determine a first task to an n-th task corresponding to the natural language instruction, wherein n is an integer greater than or equal to 1; (II) for an i-th task among the first task to the n-th task, storing i-th data required to perform the i-th task in the key-value storage through a set-value tool and acquiring an i-th key corresponding to the i-th data; (III) calling an i-th tool corresponding to the i-th task by using the i-th key, to thereby instruct the i-th tool to (i) acquire the i-th data corresponding to the i-th key from the key-value storage through a get-value tool and (ii) transmit, to the processor, an i-th task result acquired after performing the i-th task by using at least the i-th data; and (IV) repeating, by the agentic AI, the process (II) and the process (III) for an index i among 1 to n that is yet to be performed and generating, a response corresponding to the natural language instruction by referring to a first task result to an n-th task result acquired from a first tool to an n-th tool corresponding to the first task to the n-th task.

As one example, at the process of (II), the processor (i) generates i1-th data by converting a format of the i-th data through the set-value tool, (ii) stores the i1-th data in the key-value storage, and (iii) acquires an i1-th key corresponding to the i1-th data, and wherein, at the process of (III), the processor calls the i-th tool by using the i1-th key corresponding to the i1-th data, to thereby instruct the i-th tool to (i) acquire the i1-th data corresponding to the i1-th key from the key-value storage through the get-value tool and (ii) transmit, to the agentic AI, the i-th task result acquired after performing the i-th task by using the i1-th data corresponding to the i-th data.

As one example, at the process of (III) while repeating the process of (IV), the processor uses the i-th key and a k-th key, which corresponds to k-th data that is different from the i-th data, to call the i-th tool, to thereby instruct the i-th tool to (i) acquire the i-th data and the k-th data respectively corresponding to the i-th key and the k-th key from the key-value storage through the get-value tool and (ii) transmit, to the agentic AI, the i-th task result acquired after performing the i-th task by using the i-th data with the k-th data being used as a query.

As one example, at the process of (III), in response to receiving a key-error message, which is generated due to a result of an inability to obtain the i-th data corresponding to the i-th key from the key-value storage through the get-value tool, the processor performs an error correction of the i-th key that was used to call the i-th tool and re-calls the i-th tool by using the error-corrected i-th key.

As one example, the key-value storage includes a database, and the processor generates the i-th key corresponding to the i-th data through the set-value tool and stores the i-th key and the i-th data by matching them in the database.

As one example, the key-value storage includes an object storage or a cloud storage, and the processor stores the i-th data in the object storage or the cloud storage through the set-value tool and generates the i-th key by referring to path information for the i-th data stored in the object storage or the cloud storage.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
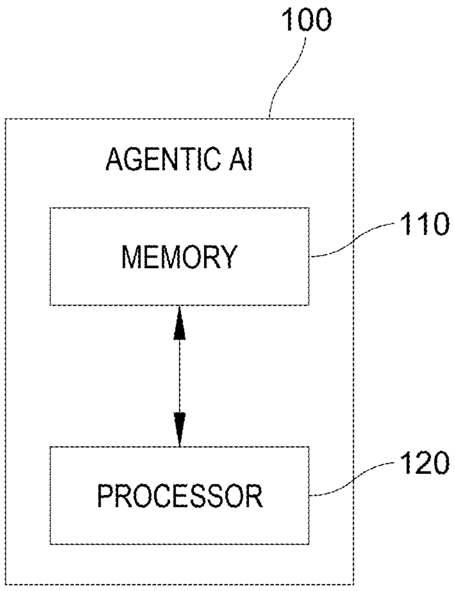
FIG. 1 is a drawing schematically illustrating an agentic AI for providing a service by using a key-value storage in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating an agentic AI 100 in accordance with one example embodiment of the present disclosure. Referring to FIG. 1, the agentic AI 100 may include a memory 110 capable of storing instructions for providing a service by using a key-value storage, and a processor 120 for performing processes of providing the service by using the key-value storage according to the instructions stored in the memory 110 in accordance with one example embodiment of the present disclosure.

Specifically, the agentic AI 100 may typically achieve a desired system performance by using combinations of at least one computing device, e.g., a computer processor, a memory, a storage, an input device, an output device, or any other conventional computing components, an electronic communication device such as a router or a switch, an electronic information storage system such as a network-attached storage (NAS) device and a storage area network (SAN), and at least one computer software, e.g., any instructions that allow the computing device to function in a specific way, but it is not limited thereto.

Further, the processor 120 of the agentic AI 100 may include hardware configurations of MPU (Micro Processing Unit) or CPU (Central Processing Unit), cache memory, data bus, etc. Additionally, software configurations of one or more applications and any OS (operating system) that achieve specific purposes may be further included.

Such description of the agentic AI 100 does not exclude an integrated device including any combination of a processor, a memory, a medium, or any other computing components for implementing the present disclosure.

Meanwhile, in response to receiving a natural language instruction, the processor 120 of the agentic AI 100 may perform a first process of analyzing the natural language instruction through an LLM (Large Language Model), to thereby determine a first task to an n-th task corresponding to the natural language instruction according to the instructions stored in the memory 110. Thereafter, for an i-th task among the first task to the n-th task, the processor 120 of the agentic AI 100 may perform a second process of storing i-th data required to perform the i-th task in the key-value storage through a set-value tool and acquiring an i-th key corresponding to the i-th data, and then perform a third process of calling an i-th tool corresponding to the i-th task by using the i-th key, to thereby instruct the i-th tool to (i) acquire the i-th data corresponding to the i-th key from the key-value storage through a get-value tool and (ii) transmit an i-th task result acquired after performing the i-th task by using at least the i-th data. Afterwards, the processor 120 of the agentic AI 100 may repeat the second process and the third process for an index i among 1 to n that is yet to be performed and then perform a fourth process of generating a response corresponding to the natural language instruction by referring to a first task result to an n-th task result acquired from a first tool to an n-th tool corresponding to the first task to the n-th task.

Figure 2:
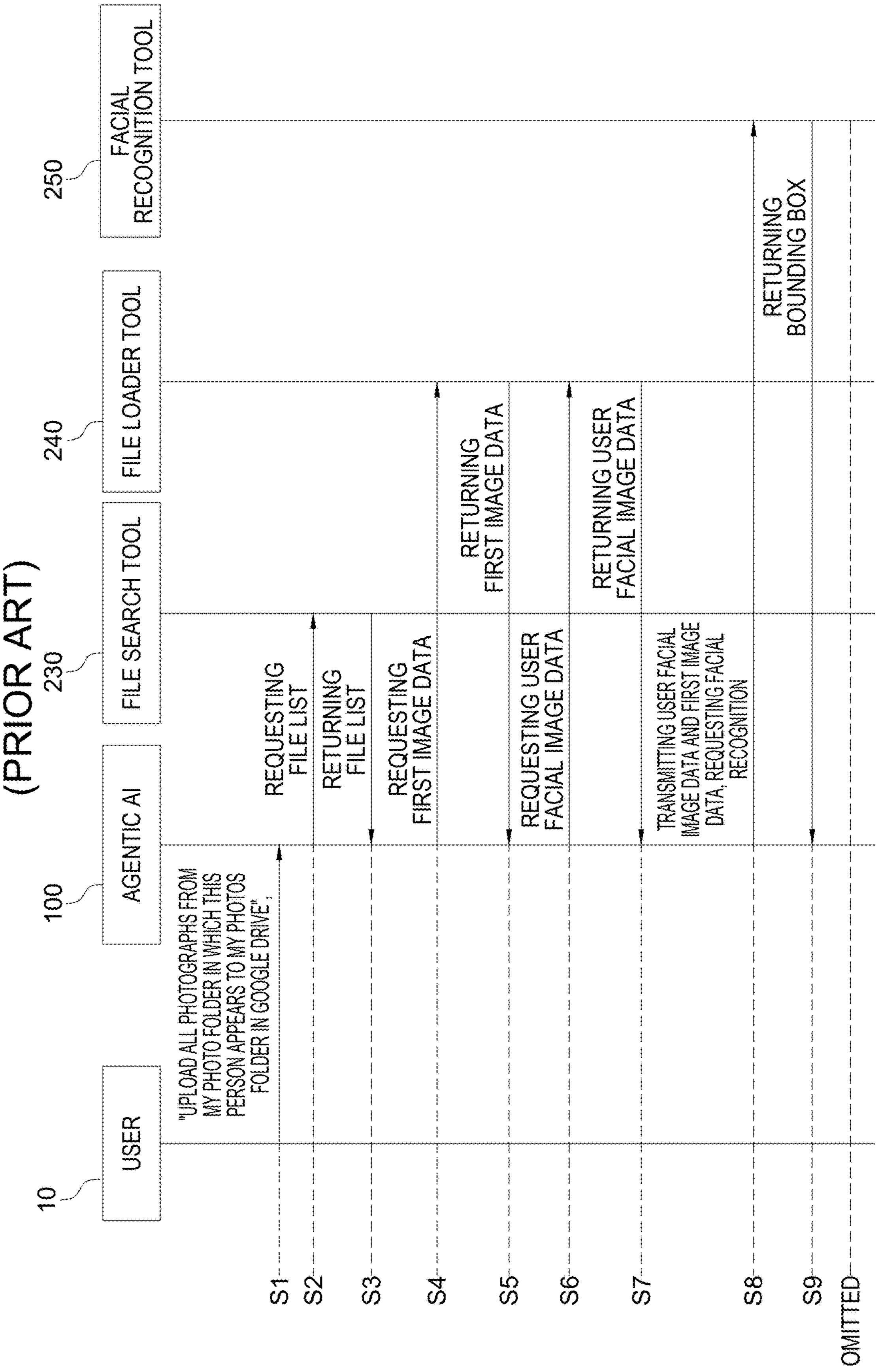
FIG. 2 (PRIOR ART)
FIG. 2 is a drawing schematically illustrating processes of providing the service according to a user request by the agentic AI in a conventional manner.

FIG. 2 is a drawing schematically illustrating processes of providing a service according to a request of a user 10 by the agentic AI in a conventional manner. That is, FIG. 2 depicts the agentic AI 100 configured to provide the service according to the request of the user 10 without utilizing the key-value storage.

For example, when the user 10 attaches his or her facial image and inputs a natural language instruction such as, "upload all photographs from my photo folder in which this person appears to My Photos folder in Google Drive", at a step of S1, the agentic AI 100 may determine tasks required to determine images including a user's face among the images stored in the my photo folder and upload the images including the user's face to the My Photos folder in Google Drive.

Further, by referring to the determined tasks, the agentic AI 100 may acquire a file list of images stored in the my photo folder of the user 10 as the first task, at steps of S2 and S3.

As one example, the agentic AI 100 may request the file list from a file search tool 230, at the step of S2, to thereby instruct the file search tool 230 to return the file list of images stored in the my photo folder of the user 10, i.e., transmit the file list to the agentic AI 100, at the step of S3. Herein, a command for calling the file search tool 230, by the agentic AI 100, may be exemplarily represented as below.

ToolCall (tool="File Search", args={"query": "*jpg", "target": "/home/my photo"})

The above command may instruct the file search tool 230 to return all images in the "JPG" format (i.e., *.jpg) stored in the my photo folder (i.e., /home/my photo) of the user 10.

Afterwards, as a second task, the agentic AI 100 may request a first image data, which is acquired by converting a first image included in the file list, through a file loader tool 240, at a step of S4, to thereby instruct the file loader tool 240 to return the first image data, at a step of S5. Herein, the agentic AI 100 may return the first image data in a base 64 string format, which is character data, after converting the first image in the JPG format into the first image data in the base 64 string format. Herein, a command for calling the file loader tool 240, by the agentic AI 100, may be exemplarily represented as below.

ToolCall (tool="File Loader", args={"path": "/home/my photo/1.jpg", "return_format": "base64"})

Additionally, similar to the second task, as a third task, the agentic AI 100 may utilize the file loader tool 240 to acquire user facial image data in the base 64 string format (after converting the attached user facial image into the base 64 string format), at steps of S6 and S7.

The reason for performing the second task and the third task is because it is necessary to convert an image format into a recognizable format prior to performing the facial recognition, i.e., because the agentic AI 100 and its associated infrastructure are designed to process text-based formats. For instance, since an image file cannot be directly transmitted to a facial recognition tool, the image format may be converted into the base 64 string format.

Next, as a fourth task, the agentic AI 100 may request the facial recognition tool 250 to perform the facial recognition on the first image data by using the user facial image data and the first image data, at a step of S8, to thereby instruct the facial recognition tool 250 to use the user facial image data as a query and thus to return a facial recognition result in a form of a bounding box by determining whether the query, which is the user facial image data, is present in the first image data, at a step of S9. Herein, a command for calling the facial recognition tool 250, by the agentic AI 100, may be exemplarily represented as below.

ToolCall (tool="Facial Recognition", args={"query": <base64 string of user facial image>, "image": <base64 string of 1.jpg>}.

Herein, as the facial recognition result, the facial recognition tool 250 may return the bounding box indicating a region in the first image where the user facial image was detected, however, the present invention is not limited thereto, and various information indicative of a presence of the user facial image in the first image may be employed to return the facial recognition result. Meanwhile, if the user facial image is not detected in the first image, the facial recognition tool 250 may return information indicating that facial recognition was unsuccessful.

Additionally, although not illustrated in FIG. 2, as a fifth task, in response to receiving the facial recognition result that the user facial image is present in the first image from the facial recognition tool 250, the agentic AI 100 may utilize a Google Drive uploader tool to upload the first image stored in the my photo folder of the user 10 to Google Drive. Herein, a command for calling the Google Drive uploader tool, by the agentic AI 100, may be exemplarily represented as below.

ToolCall (tool="Google Drive Uploader", args={"path": "/home/my photo/1.jpg", "target_folder": "My Photos"}, Thereafter, the agentic AI 100 may continue to perform similar processes for all the images included in the file list, i.e., a second image, a third image, . . . , an n-th image, such that images containing the user's face are uploaded to Google Drive.

When providing the service according to processes illustrated in FIG. 2, large volumes of data are transmitted to execute complex instructions, therefore, various errors such as typographical errors, grammatical mistakes and other types of inaccuracies may occur during text generation processes by the agentic AI 100.

Generally, in case of grammatical mistakes, the LLM is trained and implemented to review an error message that was returned and appropriately revise an original text to retry and execute the revised text, however, if no error message is returned, the text may be executed without knowing that there is an error. That is, if the data itself contains an error, i.e., there is an error in the base 64 string data itself, the LLM will operate normally since no error message is returned, and as a result, an incorrect answer may be produced, thereby causing unintended outcomes. That is, contaminated results may be returned.

Further, due to constraints that inputs and outputs between tools must be in a form of text data, the inputs and outputs must be converted into the base 64 string format as described above.

Furthermore, for commercial LLMs (such as GPT, Claude, Gemini, etc.), fees are incurred in proportion to a length of input and output texts, which may result in significant costs. Moreover, data exceeding the maximum text size (i.e., context size) that an LLM can handle may not be transmitted at all.

Therefore, the present invention aims to reduce data contamination and decrease a size of the transmitted text by delivering keys, rather than the data itself, to various tools, on the basis of the key-value storage. That is, as illustrated in FIG. 3, the present invention enables the agentic AI 100 to provide the service in response to the request of the user by utilizing the key-value storage 300.

Figure 3:
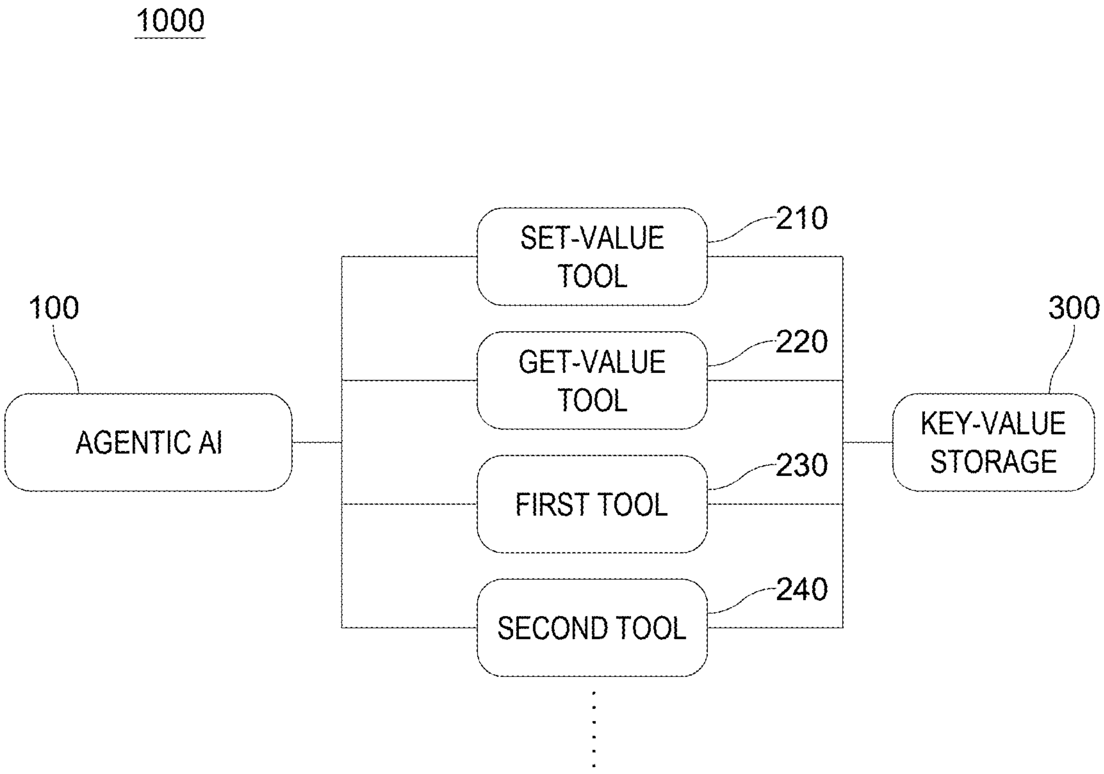
FIG. 3 is a drawing schematically illustrating a system capable of providing the service by using the key-value storage in accordance with one example embodiment of the present disclosure.

Referring to FIG. 3, the key-value storage 300 may store data to be transmitted to one or more tools available for executing tasks by the agentic AI 100.

For example, the key-value storage 300 may include a database, and the agentic AI 100 may generate a specific key corresponding to a specific data through the set-value tool 210 and may store the specific key and the specific data by matching them in the database.

As another example, the key-value storage 300 may include an object storage or a cloud storage, and the agentic AI 100 may store the specific data in the object storage or the cloud storage through the set-value tool 210 and generate the specific key by referring to path information for the specific data stored in the object storage or the cloud storage.

Further, upon receiving the specific key as input, the get-value tool 220 may be configured to output the specific data corresponding to the received specific key.

Further, according to FIG. 3, only two tools of a first tool 230 and a second tool 240 (such as the facial recognition tool, the weather tool, the cloud uploader tool) are illustrated, however, this is only for a convenience of explanation, and it is to be understood that two or more additional tools may be utilized. Referring to the system 1000 as shown in FIG. 3, a more detailed description on the method of the agentic AI 100 providing the service using the key-value storage 300 in accordance with one example embodiment of the present disclosure will be explained with reference to FIG. 4 as follows.

First, in response to receiving the natural language instruction, the agentic AI 100 may analyze the natural language instruction through the LLM, to thereby determine one or more tasks of a first task to an n-th task corresponding to the natural language instruction.

Figure 4:
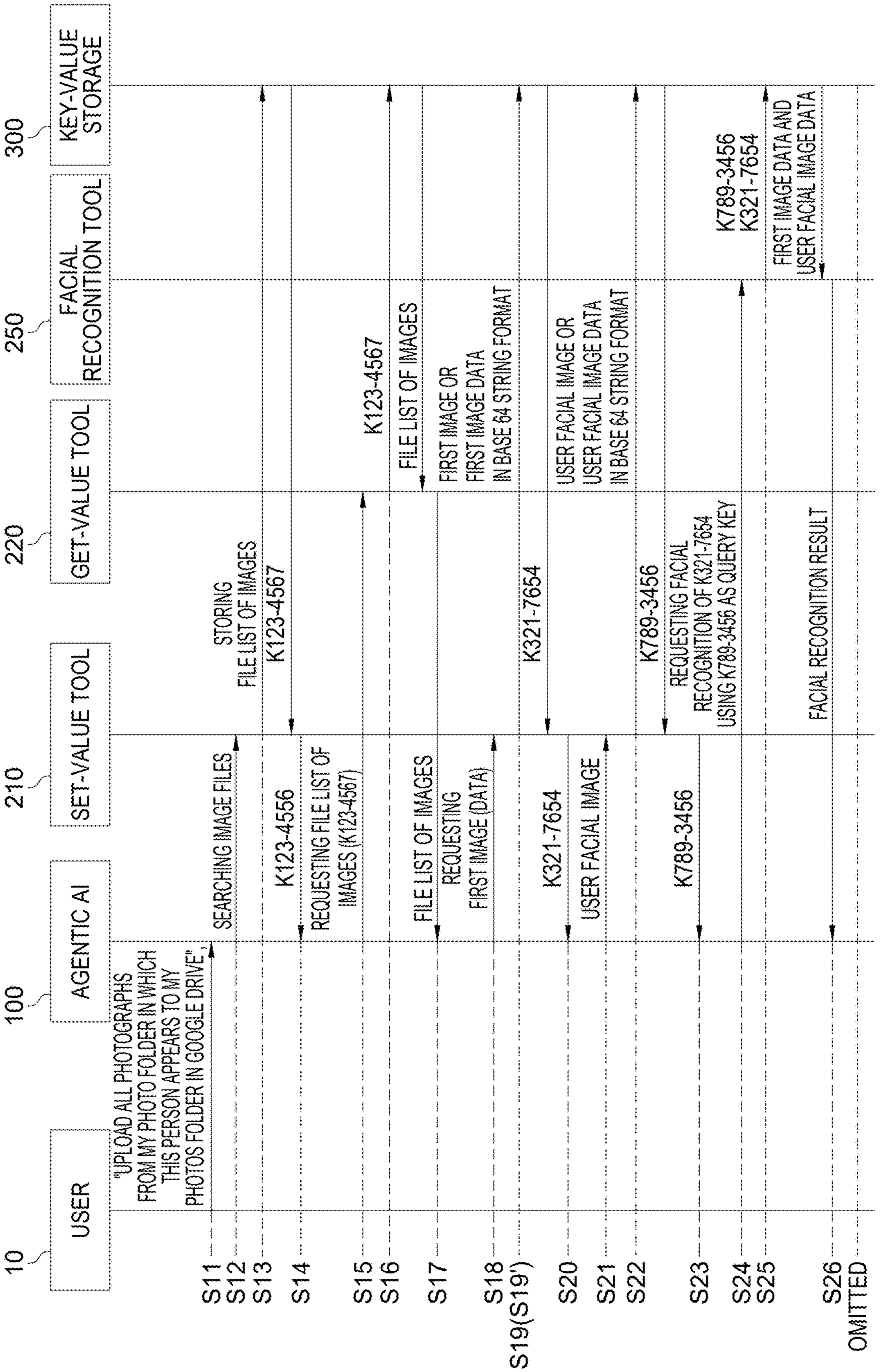
FIG. 4 is a drawing schematically illustrating a method of the agentic AI providing the service by using the key-value storage in accordance with one example embodiment of the present disclosure.

For example, by referring to FIG. 4, when the user 10 attaches his or her facial image and inputs a natural language instruction such as, "upload all photographs from my photo folder in which this person appears to My Photos folder in Google Drive", at a step of S11, the agentic AI 100 may determine tasks required to determine images including the user's face among the images stored in the my photo folder and to upload the images including the user's face to the My Photos folder in Google Drive. For instance, as subsequent tasks, the agentic AI 100 may determine tasks such as retrieving image files stored in the my photos folder, loading the user facial image, loading each of images stored in the my photo folder, performing the facial recognition by using the user facial image and each individual image stored in the my photo folder, and uploading images in which the user facial image has been recognized to Google Drive.

Thereafter, in accordance with the determined tasks, for an i-th task among the first task to the n-th task, the agentic AI 100 may store i-th data (required to perform the i-th task) in the key-value storage 300 through the set-value tool 210 and acquire an i-th key corresponding to the i-th data, and then may call an i-th tool corresponding to the i-th task by using the i-th key, to thereby instruct the i-th tool to (i) acquire the i-th data corresponding to the i-th key from the key-value storage 300 through the get-value tool 220 and (ii) transmit, to the agentic AI 100, an i-th task result acquired after performing the i-th task by using at least the i-th data.

Herein, the key-value storage 300 may be configured as the database, and the agentic AI 100 may generate the i-th key corresponding to the i-th data through the set-value tool 210, and may store the i-th key and the i-th data by matching them in the database.

Alternatively, the key-value storage 300 may be configured as the object storage or the cloud storage, and the agentic AI 100 may store the i-th data in the object storage or the cloud storage through the set-value tool 210 and generate the i-th key by referring to the path information for the i-th data stored in the object storage or the cloud storage.

Specifically, by referring back to FIG. 4, as the first task, in order to search for image files in the my photo folder, the agentic AI 100 may search for the image files stored in the my photo folder through the file search tool, serving as the set-value tool 210, at a step of S12. Herein, a command for calling the file search tool to search for the image files stored in the my photo folder may be exemplarily represented as below.

ToolCall (tool="File Search", args={"query": "*jpg", "target": "/home/my photo"})

Then, the file search tool, serving as the set-value tool 210, may acquire the file list of images stored in the my photo folder and store the file list in the key-value storage 300, at a step of S13, and return "k123-4567" as a first key corresponding to the file list of the image stored in the key-value storage 300, at a step of S14, that is, the file search tool, serving as the set-value tool 210, may transmit the first key to the agentic AI 100. Herein, a command for calling the file search tool, serving as the set-value tool 210, to store the file list of the images in the key-value storage 300 and return the first key may be exemplarily represented as below.

response=requests.post (kv_store_url, json={"key": None, "value": ["1.jpg", "2.jpg", "3.jpg", . . . ]})

In the above command, if the key-value storage 300 is called while the "key" is unspecified as "None", the key-value storage 300 may generate a random key for the file list of the images and return the random key as the first key. Although FIG. 4 illustrates the generated first key returned as "k123-4567" by way of example, an actual key generated may be done so by using UUID or hash function and may have a unique value. Next, the agentic AI 100 may request the file list of images from the get-value tool 220 by using the first key "k123-4567", at a step of S15.

Herein, a command for calling the get-value tool 220 using the first key "k123-4567", by the agentic AI 100, may be exemplarily represented as below.

ToolCall (tool="Get Value", args={"key": "k123-4567"})

Then, the get-value tool 220 may use the first key "k123-4567" to acquire the file list of the images corresponding to the first key "k123-4567" from the key-value storage 300, at a step of S16, and transmit the acquired file list of the images to the agentic AI 100, at a step of S17.

Herein, a command for calling the get-value tool 220 to acquire the file list of the images from the key-value storage 300 and to return the file list of the images to the agentic AI 100 may be exemplarily represented as below.

response=requests.get (kv_store_url, json={"key": "k123-4567"}) value=response.json( )

In the above command, the kv_store_url may be a URL address corresponding to the key-value storage 300, and the first key "k123-4567" corresponding to the file list of the images stored in the key-value storage 300 may be transmitted in JSON format to request data corresponding to the first key. As an example, the "response", which is JSON-formatted text contained in HTTP response object, may be parsed and converted into an object such as a list which is interpretable in the environment of the agentic AI 100 and may assign a variable called "value."

Further, although in the foregoing, the agentic AI 100 directly called the get-value tool 220 to acquire the file list of the images, alternatively, the agentic AI 100 may call a separate tool and instruct the separate tool to acquire and return the file list of the images through the get-value tool 220.

Subsequently, as a second task, the agentic AI 100 may refer to the file list of the images and request the first image through the file loader tool, serving as the set-value tool 210, at a step of S18, such that the file loader tool, serving as the set-value tool 210, acquires the first image "1.jpg" stored in the my photo folder and stores the acquired first image in the key-value storage 300, at a step of S19. Then, the key-value storage 300 may return "k321-4567", to the agentic AI 100, as a second key corresponding to the first image stored in the key-value storage 300, at a step of S20.

Herein, a command for calling the file loader tool, serving as the set-value tool 210, by the agentic AI 100, may be exemplarily represented as below.

ToolCall (tool="File Loader", args={"path": "/home/my photo/1.jpg", "return": "file"})

Furthermore, in the foregoing, it was explained that after the agentic AI 100 acquires the list of the image files by using the first key, the agentic AI 100 can acquire the second key corresponding to the first image data through the file loader tool, serving as the set-value tool 210. However, unlike this, if the file loader tool, serving as the set-value tool 210, supports a list data type, the agentic AI 100 may not need to perform the process of acquiring the file list of the images by using the first key, and instead directly use the first key to call the file loader tool, serving as the set-value tool 210, to thereby allow the file loader tool to acquire and refer to the file list of the images from the key-value storage 300 by using the first key and then return the second key corresponding to the first image data.

Meanwhile, in the foregoing, it was explained that the agentic AI 100 can store the i-th data in the key-value storage 300 and acquire the i-th key corresponding to the i-th data, to thereby use the i-th key to call the i-th tool corresponding to the i-th task and acquire the i-th data stored in the key-value storage 300 corresponding to the i-th key, however, unlike this, a format of the i-th data may be changed and then stored in the key-value storage 300.

That is, the agentic AI 100 may generate i1-th data by converting a format of the i-th data through the set-value tool 210 and may store the i1-th data in the key-value storage 300, and may acquire an i1-th key corresponding to the i1-th data. Moreover, the agentic AI 100 may call the i-th tool by using the i1-th key corresponding to the i1-th data, to thereby instruct the i-th tool to (i) acquire the i1-th data corresponding to the i1-th key from the key-value storage 300 through the get-value tool 220 and (ii) transmit, to the agentic AI 100, the i-th task result acquired after performing the i-th task by using the i1-th data corresponding to the i-th data.

For example, by referring to FIG. 4 again, in the foregoing description, the file loader tool, serving as the set-value tool 210, can store the first image in the key-value storage 300 and return the second key corresponding thereto to the agentic AI 100, however, unlike this, the file loader tool, serving as the set-value tool 210, may acquire the first image "1.jpg" stored in the my photo folder and change the format of the first image into the base 64 string format, to acquire the first image data, which is character data, and then store the first image data in the base 64 string format in the key-value storage 300, at a step of S19', thus returning the second key to the agentic AI 100, at a step of S20.

Herein, a command for calling the file loader tool to convert the first image data in JPG format into the first image data in the base 64 string format and to return the second key corresponding thereto, by the agentic AI 100, may be exemplarily represented as below.

ToolCall (tool="File Loader", args={"path": "/home/my photo/1.jpg", "return_format": "base64"})

Further, the agentic AI 100 may use the i-th key and a k-th key, which corresponds to k-th data that is different from the i-th data, to call the i-th tool, to thereby instruct the i-th tool to (i) acquire the i-th data and the k-th data respectively corresponding to the i-th key and the k-th key from the key-value storage 300 through the get-value tool 220 and (ii) transmit, to the agentic AI 100, the i-th task result acquired after performing the i-th task by using the i-th data with the k-th data being used as a query.

For example, by referring back to FIG. 4, as a third task, the agentic AI 100 may call the file loader tool, serving as the set-value tool 210, to store the user facial image or its corresponding user facial image data, which is acquired by converting the user facial image to the base 64 format, in the key-value storage 300, at steps of S21 and S22 through similar processes described above. Herein, the user facial image is attached by the user 10. Additionally, the file loader tool, serving as the set-value tool 210, may return a third key "k789-3456" corresponding to the user facial image data, at a step of S23. Herein, the third task may be performed prior to performing the first task or the second task. Afterwards, as a fourth task, the agentic AI 100 may use the facial recognition tool 250 to recognize the user's face in the first image. That is, the agentic AI 100 may request the facial recognition of the user facial image in the first image by calling the facial recognition tool 250 using a query key "k789-3456" corresponding to the user facial image data and the second key "k321-7654" corresponding to the first image data, at a step of S24.

Herein, a command for calling the facial recognition tool 250 by the agentic AI 100 may be exemplarily represented as below.

ToolCall (tool="Facial recognition", args={"query_key": "k789-3456", "image_key": "k321-7654"}

Then, the facial recognition tool 250 may acquire the user facial image data and the first image data from the key-value storage 300 by using the query key and the second key, at a step of S25.

Further, the facial recognition tool 250 may perform the facial recognition on the first image data by using the user facial image data as the query, i.e., may return, to the agentic AI 100, the facial recognition result by determining whether the query, which is the user facial image data, is present in the first image data, at a step of S26.

Herein, the facial recognition tool 250 may return, to the agentic AI 100, a bounding box indicating a region in the first image where the user's face is located as the facial recognition result. However, the present invention is not limited thereto, and the facial recognition result may be returned by using various types of information indicating that the user's face is included in the first image. Meanwhile, if the user's face is not present in the first image, the facial recognition tool 250 may return information indicating that the facial recognition was not successful.

Additionally, as a fifth task, in response to receiving the facial recognition result that the user facial image is present in the first image from the facial recognition tool 250, the agentic AI 100 may utilize the Google Drive uploader tool to upload the first image stored in the my photo folder of the user to Google Drive. Herein, a command for calling the Google Drive uploader tool, by the agentic AI 100, may be exemplarily represented as below.

ToolCall (tool="Google Drive Uploader", args={"path": "/home/my photo/1.jpg", "target_folder": "My Photos"})

Thereafter, the agentic AI 100 may continue to perform similar processes for all the images included in the file list, i.e., the second image, the third image, . . . , the n-th image, such that the images containing the user's face are uploaded to Google Drive.

When acquiring data by using keys through the get-value tool 220 as described above, if the agentic AI 100 receives a key-error message, the agentic AI 100 may perform an error correction of the i-th key that was used to call the i-th tool and re-call the i-th tool by using the error-corrected i-th key. Herein, the key-error message may be information regarding an inability to obtain the i-th data corresponding to the i-th key from the key-value storage 300 through the get-value tool 220.

For example, if the agentic AI 100 used an incorrect key "k789-3451" although a correct key is "k789-3456", results cannot be acquired by using the incorrect key "k789-3451", therefore, the key-error message may be generated. Accordingly, the agentic AI 100 may perform an error correction of the incorrect key that was used and re-perform the task by using the error-corrected key "k789-3456".

Therefore, by transmitting key values, it is possible to reduce the context size, use various formats of data, and detect errors in the key values.

Meanwhile, in the foregoing description, the facial recognition tool 250 was described as a separate tool, however, the present invention is not limited thereto. That is, among all tools that perform their respective functions, any tool that additionally performs a function of storing data in the key-value storage and returning the corresponding key may be utilized as the set-value tool 210, and, among all the tools that perform their respective functions, any tool that additionally performs a function of acquiring data stored in the key-value storage 300 by using the corresponding key may be utilized as the get-value tool 220.

The present disclosure has an effect of allowing data required for performing the natural language instruction to be transmitted to a tool by using the key-value storage.

The present disclosure has another effect of reducing a cost of transmission for performing the natural language instruction by transmitting a key corresponding to the data stored in the key-value storage to the tool instead of transmitting the data itself to the tool.

The present disclosure has still another effect of effectively responding to errors caused by the data itself by transmitting the key corresponding to the data stored in the key-value storage to the tool instead of transmitting the data itself to the tool.

Further, the embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present disclosure has been explained by specific matters such as detailed components, limited embodiments, and drawings. They have been provided only to help more general understanding of the present invention. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A computer implemented method of providing a service by an agentic Artificial Intelligence (AI) using a key-value storage, wherein the agentic AI performs establishing and executing multi-step plans for a natural language instruction and performs interacting with various external tools in order to handle complex tasks for the multi-step plans, comprising steps of:

(a) in response to receiving the natural language instruction, analyzing, by the agentic AI, the natural language instruction through a Large Language Model (LLM), to thereby determine a first task to an n-th task for the multi-step plans corresponding to the natural language instruction, wherein n is an integer greater than or equal to 1;

(b) for an i-th task among the first task to the n-th task, storing, by the agentic AI, i-th data required to perform the i-th task in the key-value storage through a set-value tool and acquiring, by the agentic AI, an i-th key corresponding to the i-th data, wherein the i-th key is generated by processing the i-th data to reduce a context size input to the LLM;

(c) transmitting, by the agentic AI, a command for performing the i-th task with the i-th key to an i-th tool corresponding to the i-th task, wherein the i-th task with the i-th key is generated through the LLM by using the i-th key, having a reduced context size compared to the i-th data, to thereby instruct the i-th tool to (i) acquire the i-th data corresponding to the i-th key by using the i-th key from the key-value storage through a get-value tool and (ii) transmit, to the agentic AI, an i-th task result acquired after performing the i-th task by using at least the i-th data, and confirming, by the agent AI, whether the i-th task result is a key-error message, which is generated due to a result of an inability to obtain the i-th data corresponding to the i-th key from the key-value storage through the get-value tool, if the i-th task result is the key-error message, performing an error correction of the i-th key and regenerating the i-th task with an error-corrected i-th key corresponding to the i-th data through the LLM, re-transmitting the command for performing the i-th task with the error-corrected i-th key to the i-th tool, to thereby instruct the i-th tool to re-perform the i-th task and to re-transmit the i-th task result re-performed the i-th task by using at least the i-th data acquired based on the error-corrected i-th key from the key-value store; and (d) repeating, by the agentic AI, the step (b) and the step (c) for an index i among 1 to n that is yet to be performed and generating, by the agentic AI, a response corresponding to the natural language instruction by referring to a first task result to an n-th task result acquired from a first tool to an n-th tool corresponding to the first task to the n-th task through the LLM.

2. The method of claim 1, wherein, at the step of (b), the agentic AI (i) generates i1-th data by converting a format of the i-th data through the set-value tool, (ii) stores the i1-th data in the key-value storage, and (iii) acquires an i1-th key corresponding to the i1-th data, and wherein, at the step of (c), the agentic AI calls the i-th tool by using the i1-th key corresponding to the i1-th data, to thereby instruct the i-th tool to (i) acquire the i1-th data corresponding to the i1-th key from the key-value storage through the get-value tool and (ii) transmit, to the agentic AI, the i-th task result acquired after performing the i-th task by using the i1-th data corresponding to the i-th data.

3. The method of claim 1, wherein the key-value storage includes a database, and the agentic AI generates the i-th key corresponding to the i-th data through the set-value tool and stores the i-th key and the i-th data by matching them in the database.

4. The method of claim 1, wherein the key-value storage includes an object storage or a cloud storage, and the agentic AI stores the i-th data in the object storage or the cloud storage through the set-value tool and generates the i-th key by referring to path information for the i-th data stored in the object storage or the cloud storage.

5. A computer implemented method of providing a service by an agentic Artificial Intelligence (AI) using a key-value storage, wherein the agentic AI performs establishing and executing multi-step plans for a natural language instruction and performs interacting with various external tools in order to handle complex tasks for the multi-step plans, comprising steps of:

(a) in response to receiving a natural language instruction, analyzing, by the agentic AI, the natural language instruction through a large language model (LLM), to thereby determine a first task to an n-th task corresponding to the natural language instruction, wherein n is an integer greater than or equal to 1;

(b) for an i-th task among the first task to the n-th task, storing, by the agentic AI, i-th data required to perform the i-th task in the key-value storage through a set-value tool and acquiring, by the agentic AI, an i-th key corresponding to the i-th data;

(c) calling, by the agentic AI, an i-th tool corresponding to the i-th task by using the i-th key, to thereby instruct the i-th tool to (i) acquire the i-th data corresponding to the i-th key from the key-value storage through a get-value tool and (ii) transmit, to the agentic AI, an i-th task result acquired after performing the i-th task by using at least the i-th data; and (d) repeating, by the agentic AI, the step (b) and the step (c) for an index i among 1 to n that is yet to be performed and generating, by the agentic AI, a response corresponding to the natural language instruction by referring to a first task result to an n-th task result acquired from a first tool to an n-th tool corresponding to the first task to the n-th task, wherein, at the step of (c) while repeating the step of (d), the agentic AI uses the i-th key and a k-th key, which corresponds to k-th data that is different from the i-th data, to call the i-th tool, to thereby instruct the i-th tool to (i) acquire the i-th data and the k-th data respectively corresponding to the i-th key and the k-th key from the key-value storage through the get-value tool and (ii) transmit, to the agentic AI, the i-th task result acquired after performing the i-th task by using the i-th data with the k-th data being used as a query.

6. An agentic artificial intelligence (AI) for providing a service by using a key-value storage, comprising:

at least one memory that stores instructions; and at least one processor configured to execute the instructions to perform processes of: (a) in response to receiving a natural language instruction, analyzing the natural language instruction through a large language model (LLM), to thereby determine a first task to an n-th task corresponding to the natural language instruction, wherein n is an integer greater than or equal to 1; (II) for an i-th task among the first task to the n-th task, storing i-th data required to perform the i-th task in the key-value storage through a set-value tool and acquiring an i-th key corresponding to the i-th data, wherein the i-th key is generated by processing the i-th data to reduce a context size input to the LLM; (III) transmitting a command for performing the i-th task with the i-th key to an i-th tool corresponding to the i-th task, wherein the i-th task with the i-th key is generated through the LLM by using the i-th key, having a reduced context size compared to the i-th data, to thereby instruct the i-th tool to (i) acquire the i-th data corresponding to the i-th key from the key-value storage through a get-value tool and (ii) transmit, to the processor, an i-th task result acquired after performing the i-th task by using at least the i-th data; confirming, by the agent AI, whether the i-th task result is a key-error message, which is generated due to a result of an inability to obtain the i-th data corresponding to the i-th key from the key-value storage through the get-value tool, if the i-th task result is the key-error message, performing an error correction of the i-th key and regenerating the i-th task with an error-corrected i-th key corresponding to the i-th data through the LLM, re-transmitting the command for performing the i-th task with the error-corrected i-th key to the i-th tool, to thereby instruct the i-th tool to re-perform the i-th task and to re-transmit the i-th task result re-performed the i-th task by using at least the i-th data acquired based on the error-corrected i-th key from the key-value store and (IV) repeating, by the agentic AI, the process (II) and the process (III) for an index i among 1 to n that is yet to be performed and generating, a response corresponding to the natural language instruction by referring to a first task result to an n-th task result acquired from a first tool to an n-th tool corresponding to the first task to the n-th task through the LLM.

7. The agentic AI of claim 6, wherein, at the process of (II), the processor (i) generates i1-th data by converting a format of the i-th data through the set-value tool, (ii) stores the i1-th data in the key-value storage, and (iii) acquires an i1-th key corresponding to the i1-th data, and wherein, at the process of (III), the processor calls the i-th tool by using the i1-th key corresponding to the i1-th data, to thereby instruct the i-th tool to (i) acquire the i1-th data corresponding to the i1-th key from the key-value storage through the get-value tool and (ii) transmit, to the agentic AI, the i-th task result acquired after performing the i-th task by using the i1-th data corresponding to the i-th data.

8. The agentic AI of claim 6, wherein, at the process of (III) while repeating the process of (IV), the processor uses the i-th key and a k-th key, which corresponds to k-th data that is different from the i-th data, to call the i-th tool, to thereby instruct the i-th tool to (i) acquire the i-th data and the k-th data respectively corresponding to the i-th key and the k-th key from the key-value storage through the get-value tool and (ii) transmit, to the agentic AI, the i-th task result acquired after performing the i-th task by using the i-th data with the k-th data being used as a query.

9. The agentic AI of claim 6, wherein the key-value storage includes a database, and the processor generates the i-th key corresponding to the i-th data through the set-value tool and stores the i-th key and the i-th data by matching them in the database.

10. The agentic AI of claim 6, wherein the key-value storage includes an object storage or a cloud storage, and the processor stores the i-th data in the object storage or the cloud storage through the set-value tool and generates the i-th key by referring to path information for the i-th data stored in the object storage or the cloud storage.

* * * * *